Figure 1:
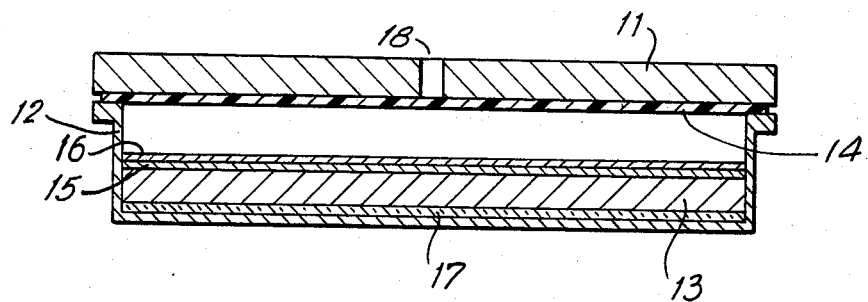

United States Patent [19]

Hanstein et al.

[11] Patent Number: 4,596,190
[45] Date of Patent: Jun. 24, 1986

[54] METHOD FOR CONCURRENTLY FORMING AND HOT-TRANSFER PRINTING A SYNTHETIC RESIN

[75] Inventors: Friedrich Hanstein, Gross-Zimmern; Hans Melzer, Wiesbaden, both of Fed. Rep. of Germany

[73] Assignee: Röhm GmbH, Darmstadt, Fed. Rep. of Germany

[21] Appl. No.: 624,225

[22] Filed: Jun. 25, 1984

[30] Foreign Application Priority Data

Jul. 8, 1983 [DE] Fed. Rep. of Germany ....... 3324709

[51] Int. Cl.[4] .................. D06P 7/00; B41M 5/035
[52] U.S. Cl. .................. 101/470; 8/471; 101/32
[58] Field of Search .............. 101/468, 470, 472; 8/471

[56] References Cited

U.S. PATENT DOCUMENTS

| | | | |
|---|---|---|---|
| 200,759 | 2/1878 | Pumphrey | 101/472 |
| 210,239 | 11/1878 | Chandler | 101/472 |
| 663,292 | 12/1900 | McCreary | 101/472 |
| 1,895,243 | 1/1933 | Dort | 101/470 |
| 2,023,858 | 12/1935 | Schatzler | 101/472 |
| 2,951,442 | 9/1960 | Schwebel | 101/470 |
| 3,632,291 | 1/1972 | Defago | 101/470 |
| 3,707,345 | 12/1972 | Kannegiesser | 101/470 |
| 3,776,133 | 12/1973 | Ritzerfeld | 101/470 |
| 3,877,964 | 4/1975 | Orman | 101/470 |
| 3,980,512 | 9/1976 | Rauser | 101/470 |
| 4,049,374 | 9/1977 | Rejto | 101/470 |
| 4,057,864 | 11/1977 | Wild | 101/472 |
| 4,058,055 | 11/1977 | Douglas | 101/470 |
| 4,059,471 | 11/1977 | Haigh | 101/470 |
| 4,066,810 | 1/1978 | Kosaka | 101/470 |
| 4,174,250 | 11/1979 | Durand | 101/470 |
| 4,462,852 | 7/1984 | Custor | 101/470 |

FOREIGN PATENT DOCUMENTS

| | | | |
|---|---|---|---|
| 2850808 | 5/1979 | Fed. Rep. of Germany | 101/470 |
| 2808949 | 9/1979 | Fed. Rep. of Germany | 101/470 |
| 2403201 | 5/1979 | France | 101/470 |
| 42277 | 12/1973 | Japan | 101/470 |
| 117211 | 9/1979 | Japan | 101/470 |
| 117209 | 9/1979 | Japan | 101/470 |
| 1479885 | 7/1977 | United Kingdom | 101/470 |

*Primary Examiner*—Clyde I. Coughenour
*Attorney, Agent, or Firm*—Curtis, Morris & Safford

[57] ABSTRACT

The method for concurrently forming and hot-transfer printing a semimanufactured product which is of a thermoplastic synthetic resin or comprises a thermoplastic synthetic resin as a surface coating to be printed, which method comprises bringing said product, maintained at forming temperature, into contact under pressure with a sheetlike dye carrier suitable for transfer printing, said dye carrier being present on a heatable backing mold heated to a temperature suitable to effect dye transfer printing and having thereon a coherent layer of a moistened water absorbent material which supports said dye carrier, said backing mold being present in a forming mold in which said product is formed under pressure concurrently with said transfer printing.

16 Claims, 2 Drawing Figures

METHOD FOR CONCURRENTLY FORMING AND HOT-TRANSFER PRINTING A SYNTHETIC RESIN

The present invention relates to a method for the forming and hot-transfer printing of a semimanufactured product consisting of a thermoplastic synthetic resin, or at least comprising a synthetic resin surface coating amenable to being formed, wherein the hot-transfer printing of the surface of the semimanufactured product is carried out during the forming operation.

The hot-transfer printing of coated surfaces of solid object such as sheet-metal strip is described in published German patent publication No. 29 14 704. The hot-transfer printing takes place as the coated sheet metal and a transfer paper pass through a calender.

In German patent publication No. 26 42 350, hot-transfer printing is combined with the coating of a solid object, a thermoplastic synthetic resin foil being laminated onto the surface of the solid object and dyes being simultaneously transferred from a dye carrier to the synthetic resin layer so applied. The laminating may be done by one of several commonly used methods, for example, high frequency or ultrasound lamination or hot gas welding.

Published European patent application No. 11,020 describes a method for the hot-transfer printing of solid objects made of a synthetic resin, or comprising a surface layer consisting of a varnish or of a synthetic resin, from a sheetlike dye carrier at a temperature suitable for the transfer of the dye, wherein the sheetlike dye carrier is pressed by superatmospheric gas pressure onto the surface to be printed during the dye transfer, while the surface is maintained at a temperature below the thermoplastic range.

This application also describes a modification of the process wherein gas pressure is applied only over a limited area in a portion of the back of the dye carrier to produce designs consisting of printed and unprinted surface portions.

At first blush, hot-transfer printing appears to be suited specifically for the printing of the plane surfaces of objects such as flat sheets, webs, or foils. In many cases the process is indeed used for this purpose.

However, the aforementioned published European patent application points out that convex, concave, or otherwise three dimensional objects such as pipes, domes, sanitary ware, illuminated signs, injection molded parts, etc., can also be printed by the process there proposed. Foamed plastics having adequate heat resistance, for example, polymethacrylimide foams, can also be used with the process. Another class of printable articles are those which have a synthetic resin surface layer, for example, a foil laminated onto or a coating applied to a substrate of another material, such as sheet metal, ceramic, glass, asbestos cement, leather, wood, particle board, fiberboard, paper, or paperboard. The resin layer to be printed should have a thickness of at least 10 micron, and preferably from 50 micron to 1 mm.

In principle, the forming of hot-transfer printed semimanufactures is feasible, provided that the semimanufactures themselves are amenable to being formed. The thermoforming of thermoplastic semimanufactures, for example, requires adequate resistance to heat and oxidation of the dyes used, which these usually possess. However, when the design produced by printing the semimanufactures represents a recognizable pattern (for example, lettering, an image, ornamentation or decoration), forming usually will result in a distortion of the pattern which often cannot be tolerated.

Thus there has been a need for method which makes it possible to produce, preferably in one operation, articles having a permanently three dimensional shape and one surface which is to be provided over at least a portion thereof with a pattern applied by printing, from semimanufactures which usually are available in plane form, for example flat sheets or plates.

Figure 2:
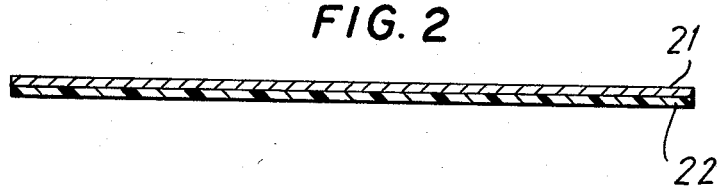

A better understanding of the present invention and of its many advantages will be had by referring to the accompanying drawings, in which FIG. 1 is a side view, in section, of an arrangement for performing the method of the invention; and FIG. 2 is a side view, in section, of a laminated article suitable for forming and printing by the method of the invention.

More in particular, FIG. 1 shows forming mold comprising upper portion 11 and lower portion 12 and, including therein backing mold 13 which is capable of being heated to a controlled temperature and is suitably separated from lower mold portion 12 by insulating layer 17. Covering backing mold 13 is covering layer 15 of a moistened water absorbent material such as paper, over which is laid sheetlike dye carrier 16. Sheet 14, of synthetic resin or have a surface layer of synthetic resin, is placed in mold 11, 12 and is brought into contact with dye carrier 16 by the application of superatmospheric pressure through aperture 18. (In other molds, contact between sheet 14 and carrier 16 may be accomplished by applying a vacuum to the interior of the mold as by the application of mechanical pressure to sheet 14, e.g. using a forming tool. Each of these embodiments is encompassed herein by the concept of forming under pressure or by the application of pressure.)

FIG. 2 shows a laminated sheet, adaptable to use as sheet 14 in FIG. 1, comprising deformable backing layer 21 of metal, paper, paperboard or the like and thermoplastic synthetic resin layer 22 which L is to be hot-transfer printed by the method of the present invention.

The sheetlike dye carriers usually employed in textile printing or in other hot-transfer printing processes are also suitable for use with the method of the invention. They may be printed in one color, or in one or more colors with any desired designs or motifs. They are usually produced by the intaglio, offset, or screen printing methods using paper, although plastic or metal foils are also used as carrier materials. For printing, special sublimable dyes are used which have adequate affinity for the synthetic resin to be printed.

The area intended to be printed usually corresponds to the contact area of the backing mold; however, printing may be limited to just a portion of the semimanufactured product which is formed by means of the backing mold. It may also be advisable to use sectioned dye carriers, which can be made to conform to the surface of the backing mold more readily than a continuous sheet. Of interest is also printing with individual forms, elements, and motifs which may be in the form of a sheetlike dye carrier or may be cut out or punched out, for example letters, script, coats of arms, and the like.

In the case of spherically curved, concave or convex backing molds, dye carriers formed from flexible plastic shapes may be of advantage.

To prevent loss of luster of the surface to be printed, a liquid or powdered release agent such as talc may advantageously be dusted onto it.

Most hot-transfer dyes sublime between 100° C. and 300° C., and more particularly between 150° C. and 250° C. The temperature of the backing mold should be coordinated with the sublimation temperature. Usually it will range from 180° C. to 300° C., and preferably from 200° C. to 260° C. The backing mold may be heated by the use of an internal or external heat source.

As a rule, it is sought to have the dye penetrate to a depth of about 20 to 100 microns into the surface to be printed.

The contact time between the surface of the backing mold and the surface of the semimanufactured product to be printed during the forming operation may range from a few seconds to several minutes. Good results will generally be obtained with contact times between 10 seconds and 5 minutes, and preferably of 1 minute.

In other respects, the technical implementation of the process is much the same as that of the known forming methods for the materials serving as substrates in the process, and in particular thermoplastic synthetic resins.

The synthetic resin semimanufactures will usually be in the form of flat plates or sheets from 1 to 10 mm thick. Particularly preferred is a semimanufactured product consisting of polymethylmethacrylate, a polycarbonate, a polyolefin such as polyethylene or polypropylene, polyvinyl chloride, polystyrene, a cellulose ether or ester, a polyamide, polyacetate, and the like.

The forming temperature used in each case should be correlated with the known characteristics of the resin to be formed. For polycarbonate, the forming temperature advantageously is 210° C., while for extruded polymethylmethacrylate it ranges from 155° C. to 165° C.

The coherent layer of a water absorbent material usually consists of a sufficiently strong fibrous material such as a fabric, preferably of paper or paperboard, in particular of filter paper. Its water content generally is from 0.005 to 0.02 g per square centimeter of layer preferably $0.0085 \pm 0.002$ g/cm$^2$, and most preferably $0.0085 \pm 0.001$ g/cm$^2$. The thickness of the layer usually ranges from 0.1 to 1 mm, and preferably from 0.4 to 0.5 mm. In place of such materials, a porous metallic thin layer, particularly of sintered metal may be used. Such sintered metals, such as sintered steel, are taught for example in Ullmanns' Enzyklopaedie der technischen Chemie, 4th Edn. Vol. 21, pgs. 558–561, Verlag Chemie, 1982.

The process will now be described in greater detail by way of example.

The synthetic resin semimanufactured product, generally in the form of a plate or sheet, is first heated to the thermoplastic state over its entire area.

The previously dried semimanufactured product usually is heated to the required temperature in a drying oven and/or by means of heat sources such as infrared lamps. The backing mold is also maintained at the requisite temperature, for example by circulating a heatable liquid through it. Disposed on top of it is the coherent layer of water absorbent material, which has been moistened, and superimposed thereon is the sheetlike dye carrier. The semimanufactured product, clamped in a conventional forming station, is then formed by means of a forming tool or of a vacuum, the surface of the semimanufactured product being pressed onto the sheetlike dye carrier, present as the uppermost layer overlying the backing mold. When forming is carried out in a vacuum forming station, a vacuum ranging from 100 to 200 mm Hg is generally employed. With contact pressure, the pressure used will generally range from 0.5 to 6 bars, and preferably from 1 to 2 bars. At the end of the requisite retention time, the material is removed from the mold.

The method of the invention permits semimanufactures to be formed and printed by the hot-transfer techniques in one operation. An essential feature of the process is the presence of a coherent layer of a water absorbent material in a slightly moistened state. If this requirement is disregarded in carrying out the forming operation, the results usually will be wholly unsatisfactory. The products of the process of the invention are generally distinguished by freshness and bright colors, surface luster or smoothness, durability of the transferred dyes in use, etc. One important advantage is that the process also permits the forming of substrates which merely have a synthetic resin surface coating, for example, sheet metal, pressed board made of wood, paperboard or paper, etc.

What is claimed:

1. The method for producing a semimanufactured product having a dye image therein from a rigid sheet of thermoplastic resin or a rigid sheet having a thermoplastic resin as a surface coating, which method comprises; providing a backing mold in the general shape desired for the product; placing a moistened water absorbent material over said backing mold; placing a sheetlike dye carrier having thereon a sublimable dye suitable for hot transfer printing over said water absorbent material; placing said rigid sheet over said dye carrier; heating said backing mold to a temperature from 180° C. to 300° C. suitable to effect hot transfer printing and to heat said rigid sheet to a temperature at which it can be shaped or formed; applying pressure to said rigid sheet; and concurrently shaping said sheet and fixing a dye image therein by heating and bringing the sheet into direct contact under pressure with said sheetlike dye carrier, whereby dye, assisted by steam, transfers from said dye carrier to said product.

2. A method as in claim 1 wherein said product is a thermoplastic resin.

3. A method as in claim 1 wherein said product comprises an acrylic resin.

4. A method as in claim 1 wherein said product comprises a polycarbonate.

5. A method as in claim 1 wherein said product comprises a polyolefin.

6. A method as in claim 1 wherein said product comprises polystyrene.

7. A method as in claim 1 wherein said backing mold is a hot plate or is heated by the presence therein of a heatable liquid and is insulated from the adjacent wall of the forming mold by a heat insulating layer.

8. A method as in claim 1 wherein said backing mold is heated to a temperature from 200° C. to 260° C.

9. A method as in claim 3 wherein said product is maintained at a forming temperature between 155° C. and 180° C.

10. A method as in claim 1 wherein said product comprises a plurality of layers, of which at least one surface layer is of a thermoplastic synthetic resin.

11. A method as in claim 10 wherein said thermoplastic synthetic resin surface layer is laminated onto a metallic substrate.

12. A method as in claim 10 wherein said thermoplastic synthetic resin surface layer is laminated onto a paper or paperboard substrate.

13. A method as in claim 10 wherein said thermoplastic synthetic resin surface layer has a thickness from 10 micron to 1 mm.

14. A method as in claim 1 wherein said coherent layer of a water absorbent material is a layer of filter paper.

15. A method as in claim 1 wherein said coherent layer of a water absorbent material has a thickness from 0.1 mm to 1 mm.

16. A method as in claim 1 wherein said coherent layer of a water absorbent material has a water content of $0.0085 \pm 0.001$ gram per square centimeter.

* * * * *